Patented Feb. 7, 1950

2,496,745

UNITED STATES PATENT OFFICE 2,496,745

SUSPENSIONS OF CHLORINATED MATERIALS AND METHODS OF MAKING THE SAME

Harry S. Olson, Painesville, Ohio, assignor to Diamond Alkali Company, Cleveland, Ohio, a corporation of Delaware No Drawing. Application October 9, 1946, Serial No. 702,088

5 Claims. (Cl. 260—28.5)

1

This invention relates to highly chlorinated organic materials and in particular relates to suspensions in water of such highly chlorinated substances and to methods of making the same.

As an example of the type of material to which the present invention is particularly applicable may be cited chlorinated paraffin containing 65% or more of chlorine. Organic materials having this high percentage of chlorine are normally solids at relatively elevated temperatures and thus may not conveniently be emulsified with water.

It has heretofore been proposed to form a solution of such chlorinated materials in an organic solvent, for example, toluol, and then to combine such solution with water under conditions lending themselves to the formation of an emulsion. Without regard to the success of such practices, the use of an organic solvent is a limitation thereon which renders the procedure unacceptable to many industries, particularly industries where the use of flammable and thus dangerous organic solvents is undesirable or from the practical standpoint, because of lack of equipment and proper safeguards to handle the same, impossible. Such industries have heretofore foregone the advantages of using such highly chlorinated materials, such as chlorinated paraffin, in an emulsified or suspended form because of this disadvantage.

The present invention contemplates the solution of this difficulty and the provision of a suspension of such chlorinated materials in water without the use of organic solvents. More particularly, the invention contemplates the provision of a novel composition of matter comprising organic materials chlorinated to more than 65% of their weight in which form they are solids at temperatures approaching the boiling point of water, permanently and stably suspended in water. It has been found in general that the objects of this invention may be achieved by subdividing solid chlorinated materials, such as chlorinated paraffin, into particles having an average diameter size of 10 microns or less in the presence of a suitable suspending agent and water and that when so subdivided in the presence of such agent, stable, non-breaking suspensions are obtained, which suspensions may be suitably diluted substantially to infinity with water without breaking. The suspensions, furthermore, are stable to dilute acids and alkalies and to relatively severe temperature changes within the range of the freezing and boiling points of water. The suspensions are further found to be compatible with oils, plasticizers, and

2 the like whereby their application for various industrial purposes is enhanced. They have as a particular advantage the fact that the suspending process imparts to the material no more color than was present in the original unsuspended chlorinated material.

The suspensions of this invention have particular application in many industries where the use of organic solvents because of fire hazards, toxicity, and the like is undesired. For example, they have wide application in the paper industry where it is often desired to incorporate highly chlorinated paraffin into paper to impart water resistance or flame resistance or other properties to the paper. Chlorinated paraffin has a similar application in the rubber industry in both natural and synthetic latex emulsions to impart increased adhesion and flame resistance to adhesive materials and here the provision of a suspension of chlorinated material without use of organic solvents is highly desirable. The suspensions of this invention are also applicable in the impregnation of wood and in the fabrication of various waxes, polishes, and other surface improving materials. They may also be applied to waterproofing compositions, as well as to asphalt emulsions for paints and similar surface preserving compositions. From the recitation of these various specific proposed applications, it will be apparent to those skilled in the art that by the provision of an organic-solvent-free suspension of highly chlorinated organic materials in water, there has been produced a material which will broaden the field of application of the chlorinated materials themselves.

It has been found that in order to produce optimum results, a suspending agent is desirably incorporated with the chlorinated hydrocarbon material during the time the material is being treated in order to reduce its particle size, and for this purpose it is preferred to use polyvinyl alcohol. Polyvinyl alcohol is a material of varying molecular weight depending upon the degree of polymerization present in a particular sample and it may conveniently be made by the saponification of polyvinyl acetate according to a process which does not form a part of the present invention. The character and properties of polyvinyl alcohols are generally identified by reference to comparative viscosities of the polymerized materials and while it has been found that all polyvinyl alcohols are suitable for application to the present invention, those substantially completely saponified materials having a viscosity averaging approximately 50 centipoises in a 4% solution in water at 20° C., have given optimum results.

The method of reducing the particle size of the chlorinated materials herein disclosed, which has been found most useful, is relatively extended ball milling employing flint, or in the case where slight darkening of color is not important, steel balls, but various types of mixers, homogenizers, colloid mills, and the like particularly those having a shearing or cutting action in addition to their mixing function, have also been found useful and their use has resulted in excellent stable suspensions in much shorter times than can be obtained by ball milling. The invention, however, is not limited to the specific type of particle size reducer involved as many other convenient mills, mixers, grinders, and the like will suggest themselves to those skilled in the art.

In order more particularly to point out and disclose means in which this invention may be practiced, the following specific examples are set forth:

1. To 68½ parts of water is added 1½ parts of polyvinyl alcohol of the completely saponified type having a viscosity of 50 centipoises in a 4% solution in water at 20° C. and while mixing, 30 parts of chlorinated paraffin containing between 69 and 71% chlorine are added. The mixture is milled for 66 hours in a ball mill employing flint balls, and upon removal from the mill is found to comprise a suspension stable over long periods of time without breaking. After several days of standing, a slight settling is observed which is readily resuspended by shaking by hand. The suspension is diluted with 100 parts of water and found not to break.

2. A mixture of 50 parts of chlorinated paraffin containing 69-71% chlorine, 1½ parts of polyvinyl alcohol as in Example 1, and 48½ parts of water is milled in a ball mill employing steel balls for a period of 42 hours. On removal from the mill, the material is found to comprise a semi-solid mass dilutable in all proportions with water without breaking the suspension. The suspension is further found to be substantially stable for long periods of time whether in its original form or diluted with water.

As noted above, suspensions in water of chlorinated materials, particularly chlorinated paraffins, where the chlorine content is of the order of 65 to 85% are highly useful, particularly in the paper industry, for forming flameproofing mixtures to be applied to paper and the following example sets forth a method for compounding such flameproofing mixture.

3. A mixture of 20 parts of solid chlorinated paraffin, 20 parts of calcium carbonate, 10 parts of antimony oxide, 2 parts of polyvinyl alcohol as in Example 1, and 48 parts of water is ball milled at room temperature for a period of 24 hours employing flint balls. The product on being removed from the mill is a thick fluid suspension showing excellent stability over long periods of time and dilutable in all proportions with water. This material when applied to paper renders it substantially flame-resistant.

For some purposes to which the suspensions of this invention are applied, it has been found useful to employ a stabilizer for the suspension which, when the particles of chlorinated materials are sufficiently finely divided and suspended by any of the methods set forth above, will stabilize the suspension against even the small amount of settling noted, for example, above in connection with Example 1. Examples of such stabilizers are cetyl alcohol, methyl cellulose, gum tragacanth, gum arabic, and Karaya gum. Amounts of such stabilizers up to 2% of the total mass have been found to be useful. An example of a preparation involving the use of gum tragacanth as a stabilizer, which material is preferred in this connection, is as follows:

4. A mixture of 30 parts of solid chlorinated paraffin, 1½ parts of polyvinyl alcohol, ½ part of gum tragacanth, and 68 parts of water is ball milled at room temperature for a period of 42 hours. At the end of this time a stable, thick suspension is obtained which is dilutable in all proportions with water without breaking and may be stored indefinitely without substantial settling.

As suggested above, the importance of the milling or mixing treatment does not lie in the type of equipment employed nor in the length of time the suspensions are treated but rather in the reduction of the particles of chlorinated materials to the proper size which will enable them to remain suspended for suitable periods of time. An example of treatment of chlorinated materials in a different type of equipment wherein substantially the same action is obtained follows:

5. 30 parts of 69 to 71% chlorinated paraffin are combined with 1½ parts of polyvinyl alcohol of the type described in Example 1, and ½ part of Karaya gum. This mixture is added to 68 parts of water at room temperature and the whole is stirred in a high speed mixing device (the "Homo-Mixer," manufactured by Eppenbach, Inc., of Long Island City, New York) having provision for exceedingly high impact of stirrer blades against the material treated. The mixing is continued for a period of 5 minutes. The material, when removed from the mixer, is a relatively viscous thickened fluid, the particles of which are of the average order of 10 microns in diameter. The suspension is found to be stable on standing for periods up to 10 days, during which time no breaking and very little settling occurs.

The preferred chlorinated materials to which this invention is directed are chlorinated hydrocarbons, particularly chlorinated paraffin containing more than 65% of chlorine. Chlorinated paraffins containing from 60 to 71% of chlorine have been found to be particularly useful. In addition, stable organic-solvent-free dispersions may be formed by the method of this invention of various other chlorinated materials which have been chlorinated to the extent that their melting points are equal to or exceed the boiling point of water whereby emulsions with water cannot be formed directly. Examples of such materials are chlorinated polyethylene, polyvinyl chlorides, chlorinated corn oil, sunflower oil, coconut oil, olive oil, peanut oil, mustard seed oil, perilla oil, linseed oil, and rapeseed oil. The dispersions of these materials so formed can be diluted with large volumes of water without breaking the suspension.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of forming a stable aqueous dispersion of solid, highly chlorinated, paraffin containing at least 65% of chemically combined chlorine, which includes the steps of combining said material with a dispersing agent comprising polyvinyl alcohol and subjecting said mixture to milling to suspend said chlorinated paraffin in the water.

2. The method of forming a stable aqueous dispersion of chlorinated paraffin having a chlorine content of more than 65%, which includes the steps of combining said chlorinated paraffin with polyvinyl alcohol and milling said mixture in the presence of water until the particle size of said chlorinated paraffin is reduced to the average order of at most 10 microns in diameter.

3. A composition of matter comprising a stable aqueous suspension of solid, chlorinated, paraffin having a chlorine content of more than 65% and polyvinyl alcohol, said chlorinated material having a particle size of the average order of not more than 10 microns.

4. A composition of matter comprising a stable aqueous suspension of chlorinated paraffin having a chlorine content of at least 65% and polyvinyl alcohol.

5. A stable aqueous suspension of chlorinated paraffin having a chlorine content of 69% to 71% chlorine and polyvinyl alcohol.

HARRY S. OLSON.

REFERENCES CITED

The following references are of record in the file of this patent:

UNITED STATES PATENTS

| Number | Name | Date |
|---|---|---|
| 2,277,788 | Shipp et al. | Mar. 31, 1942 |
| 2,413,163 | Bacon | Dec. 24, 1946 |

OTHER REFERENCES

"Polyvinyl Alcohol," Procedure for Emulsifying "Opalwax," E. I. du Pont de Nemours and Company, R. and M. Chemicals Div., Wilmington, Del., January 10, 1941, page 1.